United States Patent [19]

Brooks et al.

[11] 4,361,593

[45] Nov. 30, 1982

[54] PROCESS FOR PREPARING DRY QUICK-COOKING PARBOILED RICE AND PRODUCT THEREOF

[75] Inventors: Arthur W. Brooks; Vahan M. Garibian; Monoj K. Sarma, all of Dover, Del.

[73] Assignee: General Foods Corporation, White Plains, N.Y.

[21] Appl. No.: 220,564

[22] Filed: Dec. 29, 1980

[51] Int. Cl.$^3$ ............................................. A23L 1/182
[52] U.S. Cl. ................................... 426/627; 426/461; 426/462
[58] Field of Search ............... 426/618, 619, 626, 627, 426/455, 456, 461, 462, 506, 508, 509, 510, 511

[56] References Cited

U.S. PATENT DOCUMENTS

| | | | |
|---|---|---|---|
| 2,438,939 | 4/1948 | Ozai-Durrani | 426/627 |
| 2,546,456 | 3/1951 | Landon et al. | 427/461 |
| 2,592,407 | 4/1952 | Fernandes | 426/311 |
| 2,653,099 | 9/1953 | Carman et al. | 426/621 |

FOREIGN PATENT DOCUMENTS 807084 1/1959 United Kingdom .

OTHER PUBLICATIONS

Houston, Rice Chemistry and Technology, Published by American Association of Cereal Chemists, 1972, U.S. pp. 421 & 368–378.
Demont et al., Effects of Certain Variables on Canned Rice Quality, 9/68, pp. 136–138 of Food Technology, vol. 22, 1187.
Bhattacharya et al., Effect of Processing Conditions on Quality of Parboiled Rice, 9/66, pp. 476–479 of J. Agr. Food Chem., vol. 14 #5.
Ali et al., Starch Retrogradation and Starch Damage in Parboiled Rice and Flaked Rice, 1976, pp. 233–240, Die Starke 28, Jahrg., Nr. 7.
Ali et al., Hydration and Amylose–Solubility Behavior of Parboiled Rice, 1972, pp. 207–212, Iwt, vol. 5, No. 6.
Ferrel et al., Use of Amylograph to Determine Extent of Cooking in Steamed Rice, 1/1964, Cereal Chemistry, vol. 41, No. 1
Birch et al., Degree of Gelatinisation of Cooked Rice, 1973, Die Starke 25, Jahrg., Nr. 33.

Primary Examiner—Thomas G. Wiseman
Assistant Examiner—Elizabeth A. Hatcher
Attorney, Agent, or Firm—Thomas R. Savoie; Walter Scott; Daniel J. Donovan

[57] ABSTRACT

The principal objects of the present invention are to provide an improved dry parboiled rice product and a process for preparing it, wherein the rice can be rapidly rehydrated for consumption, but yet is relatively non-starchy. This is achieved by modifying prior art parboiled rice procedures by less than completely gelatinizing the starch during steaming, and then tempering the rice under non-gelatinizing conditions for a period of time effective to reduce subsequent rupturing of the starch granules upon rehydration.

17 Claims, No Drawings

PROCESS FOR PREPARING DRY QUICK-COOKING PARBOILED RICE AND PRODUCT THEREOF

BACKGROUND OF THE INVENTION

Technical Field

This invention relates to an improved form of parboiled rice and a process for preparing it. In particular, the parboiled rice of the invention cooks rapidly, and yet is free of starchiness.

There are many recipes and occasions for which rice is so highly preferred that it seems indispensable. The art has long endeavored to improve upon natural raw rice in terms of its cooking and eating qualities. Up to the present time, however, it has not been possible to produce a rapidly cooking rice which is non-starchy and yet has a texture comparable to parboiled rice.

Parboiled rice is typically prepared by soaking rough rice paddy (unhulled rice, substantially as it comes from the field) in cold, warm or hot water for a substantial period of time, until the rice kernels have increased their moisture content, generally to at least above 20%; steaming the rice, generally at super-atmospheric pressure, to gelatinize the rice; and then drying the rice. The steaming partially opens the hulls and subsequent to steaming the kernels are dried and then milled.

Raw rice which is not parboiled, but is milled in the dry raw state, is generally quite rapidly cooked. Typically, cooking times of around 10 to 15 minutes will be achieved; however, the rice resulting from this process is extremely starchy tasting. It is believed that water enters the individual starch granules within the rice kernels and causes them to swell, then burst releasing free molecular starch and yielding a very starchy, pasty feel in the mouth. The starch in the raw milled rice, as stated in the name, is essentially ungelatinized (raw). When the rice is ground and tested by amylograph analysis on a Brabender Viscometer in standard fashion, the ground rice will show a breakdown value of within the range of from about 250 to 500 brabender units. The amylograph breakdown value is the difference in viscosity, as recorded on the amylograph curve, between the peak viscosity and viscosity after a hold time, which is believed indicative of the amount of starch granules which have ruptured causing the reduction in viscosity. The free molecular starch released as the starch granules rupture causes starchiness, thus the breakdown value is directly proportional to the starchiness of the hydrated rice. This test is carried out by: grinding 50 grams of milled rice and blending with 450 ml. of distilled water; placing the sample in the Brabender Viscometer which is set at a starting temperature of 30° C.; and then heating and holding in the standard fashion (see Halick and Kelly, Cereal Chem. 36 (1), 1959 and Ferrel and Pence, Cereal Chem. 41 (1), 1964).

Parboiled rice, shows a great degree of improvement in its freedom from starchiness as evidenced by amylograph breakdown values of around 0 brabender units or even a slightly negative value (indicating an increase in viscosity after hold time). In the case of a negative amylograph breakdown value not only are starch granules remaining unbroken, but they continue to swell. This advantage in organoleptic improvement is, however, offset to a degree by the increased cooking time required to fully rehydrate the dry parboiled rice to achieve a cooked product. Typically, parboiled rice will require from 20 to 25 minutes to reach full hydration.

A quicker-cooking parboiled rice on the order of about 15 minutes can be achieved by reducing the severity of the parboiling procedure, however, the ultimately cooked parboiled rice becomes starchy. Typically, the quicker cooking parboiled rice prepared in this manner shows very high amylograph breakdown values, being at least 150 brabender units and typically being around 200 brabender units and higher.

BACKGROUND ART

In an alternative to parboiled rice, a major advance was taught by Durrani in U.S. Pat. No. 2,438,939. According to that process, a dry precooked quick-cooking rice was prepared which could be rehydrated for consumption by the consumer in as little as 10 minutes. The rice was precooked by subjecting a milled rice to heat and moisture to increase the moisture content to about 65 to 80% and to gelatinize the starch granules. Thereafter, the grains were dried to set them in their enlarged condition.

Despite the advantages of quick-cooking precooked rice, many consumers still prefer the eating consistency produced by parboiled rice. The precooked rice as prepared by these procedures, while being quick cooking, is very light and fluffy in texture. This precooked rice is not starchy as the free molecular starch is generally washed out in the precooking process. Raw white milled rice is very starchy, but is also suitably dense and relatively quick cooking. Parboiled rice is desirably dense and non-starchy, but takes a relatively long period of time to finally cook.

Typically, in parboiled rice the starch granules therein are at least 80% gelatinized and will show an absence of birefringent crosses as measured under polarized light. The percent of gelatinization of rice, as referred to herein, can be measured indirectly through percent alkali soluble starch according to the procedure set forth by Birch and Priestley in the publication Die Starke, 25, Jahrg. 1973, Nr. 3, pages 98–100.

In a paper by Bhattacharya and Rao in the Journal of Agricultural Food Chemistry, Vol. 14, No. 5, 1966, at pages 476–479, the effect of various conditions of soaking and steaming of paddy (rough rice) during parboiling are studied for their effect upon the cooking quality and the color of parboiled rice. It was concluded therein that the greater the severity of heat treatment during soaking and steaming, the lower the water uptake and the darker the color of the rice. While not supplying any data to the effect, the article states that it was observed that heaping of hot parboiled paddy in bulk prior to drying was similar in effect of continued steaming.

According to the disclosure of the Bhattacharya and Rao reference, where a soft cooking quality and low color is desired, quick cooling after parboiling may be the most important factor in industrial operations. Where the reverse of this is desired, this could be achieved by either prolonging the steaming step or heaping the parboiled paddy in bulk prior to drying. There is no discussion, however, of the relative importance of the various processing conditions on the preparation time of the dried rice products, or of their relative organoleptic qualities such as starchiness.

SUMMARY OF THE INVENTION

Briefly, the present invention prepares a dry parboiled rice which upon rehydration is both quick cooking and has reduced starchiness. This dry quick-cooking parboiled rice is prepared by soaking rough rice, steaming the soaked rice to partially gelatinize the starch granules, then tempering the steamed rice at a moisture content, temperature and for a period of time effective to reduce starchiness of the rice upon rehydration. After tempering, the rice is dried and milled.

DETAILED DESCRIPTION OF THE INVENTION

In accordance with the present invention, there is provided an improved dry, quick cooking, parboiled rice product and a process for preparing it.

The dry parboiled rice product of the present invention is characterized in that substantially all of the starch granules in the rice kernels are at least partially but less than fully gelatinized, and the dry parboiled rice product can be fully cooked in less than 20 minutes in water boiling at atmospheric pressure, and yet with reduced starchiness in the rehydrated parboiled rice, as evidenced by amylographic analysis of the parboiled rice exhibiting a reduced breakdown value of typically less than 100 brabender units.

The process according to the present invention enables the preparation of a dry parboiled rice product which requires a reduced rehydration time while producing a rehydrated rice with decreased starchiness and comprises: (a) soaking rough rice in water to increase the moisture content to 30 to 45% by weight but without effecting substantial gelatinization; (b) steaming the hydrated rice to partially gelatinize substantially all starch granules in the rice kernel but without fully gelatinizing said granules; (c) tempering the partially-gelatinized rice for a period of time, at a temperature below the gelatinization temperature of the starch, and maintaining a level of moisture above 20%, effective to reduce subsequent rupturing of the starch granules upon rehydration; (d) drying the rice to a moisture content of less than 15%; and (e) milling the rice.

Conventional parboiling will typically include a steeping step wherein the rice is soaked in hot water sufficiently to hydrate it to from about 30 to about 45%, then steamed under conditions effective to gelatinize the starch and then rapidly cooled prior to drying. The present invention is based upon the discovery that quickly-cooking dry parboiled rice products, capable of producing a non-starchy cooked product, can be obtained where the rice critically is both partially gelatinized and tempered under moist, non-gelatinizing conditions after steaming, but prior to drying.

The tempering step according to the present invention has been found to dramatically reduce the starchiness of the final product even though final cooking is reduced to less than 20 minutes, typically about 15 minutes. The degree of reduction in starchiness is evidenced by the amylograph breakdown which will show values of less than 100 brabender units and, more typically, in the 0 to 50 brabender unit range. While not wanting to be bound to any particular theory, it is believed that the tempering of the partially gelatinized rice in a hydrated and energized state allows the formation of associative bonding between adjacent starch molecules within individual starch granules, rendering the starch granules of the dry parboiled rice upon rehydration more resistant to penetration of water into the starch granules which would tend to swell and subsequently rupture the granules, producing starchiness. This dry tempered parboiled rice is thereby able to hydrate more uniformly, avoiding rupturing of starch granules which causes starchiness. In comparison, a dry parboiled rice which is quick cooking (i.e. by being partially gelatinized) but without the tempering step, upon hydration results in a substantial amount of the starch granules rupturing rendering the rice very starchy, as evidenced by amylograph breakdown values of about 150 to 250 brabender units.

Aside from the combination of the steaming and tempering steps of the present invention which render the dry parboiled rice both quick cooking and non-starchy upon rehydration, the remainder of processing to achieve a dry parboiled rice product is similar to that practice by the prior art. Thus, as with the prior art, the rough rice is preferably treated to either remove the air which is trapped under the rice husks by subjecting the rice to a partial vacuum prior to steeping the rice under atmospheric pressure, or the rice can be steeped under elevated pressure to displace the air. For example, a vacuum of at least 25 inches of mercury (0.9 Kg per $cm^2$) will be employed for about 30 minutes to remove entrapped air and aid soaking of the rice.

During the soaking or steeping step the water is introduced into the chamber and is steeped below the gelatinization temperature of rice for a period of time effective to raise the moisture content thereof to within the range of from about 30 to about 45%, preferably from about 35 to about 40%. The temperature of the water will typically be within the range of from about 140° to about 170° F. (about 60° to about 73° C.), and preferably from about 155° to about 165° F. (about 68° to 74° C.). The soaking is preferably carried out under atmospheric pressure for a time of from about 1 to about 4 hours, with about 2 to about 3 hours being preferred.

When a vacuum is used prior to soaking the water can be introduced while still under vacuum. Where it is desired to eliminate the vacuum step, the steeping may be done under imposed air pressure at the same time and temperature ranges given above, but at pressures of from about 50 to 150 psig (about 3.5 to 10.5 Kg per $cm^2$).

To increase the whiteness of the resultant parboiled rice product, it may be desirable to acidify the steep water by adding an acid, such as adipic or phosphoric acid, to achieve a pH of from about 3 to 7, preferably about 4 to 5. The acid may bleach the rice somewhat and reduce browning enzymes to achieve the lightest product color.

Upon attainment of the desired moisture content, the hydrated rice is removed from the steep water and steamed to partially gelatinize substantially all starch granules in the rice kernels but without fully gelatinizing said starch granules. The steam is preferably low pressure saturated steam, and is preferably supplied under conditions effective to maintain the hydrated rice at a temperature of from about 170° to about 210° F. (about 77° to about 100° C.), preferably from about 180° to about 190° F. (about 80° to 90° C.), for a period of time effective to partially gelatinize the rice starch. Steaming times will typically be within the range of from about 5 minutes to about 1 hour, and preferably within the range of from about 10 minutes to about 20 minutes. The percent of gelatinization in the partially gelatinized rice, as measured indirectly through percent alkali soluble starch, will be from about 20 to about 70%, and preferably from about 30 to about 55%, as compared to a fully gelatinized rice in which the rice starch will be gelatinized to at least 80%. Stated another way, a fully gelatinized rice will not have any birefringent crosses remaining when observed under polarized light, while a partially gelatinized rice will have some birefringent crosses remaining.

It is important to restrict the degree of starch gelatinization which occurs according to the invention. Where the rice starch is fully gelatinized beyond the degree indicated, the rice will require the lengthy cooking (rehydration) times of about 25 minutes of conventional parboiled rice. To achieve the rapid cooking times (e.g. less than 20 minutes) desired according to the present invention, it is necessary to partially gelatinize the rice starch by stopping the gelatinization short of completion.

The partially gelatinized rice is then tempered under conditions of time and temperature, below the gelatinization temperature, effective to reduce the subsequent rupturing of the starch granules and resultant starchiness upon rehydration. By restricting the degree of gelatinization, a quicker-cooking dry parboiled rice is obtained; however, this also will increase the undesireable starchiness of the rice upon rehydration. The tempering step will reduce this starchiness in the rehydrated quick cooking parboiled rice.

In order to achieve a practical degree of reduction of subsequent rupturing of the starch granules, the moisture content of the rice should be maintained at a level of at least about 20% during the tempering process. The temperature during the tempering step will typically be within the range of from about 70° to about 150° F. (about 20° to about 65° C.), and will preferably be within the range of from about 125° to about 135° F. (about 50° to about 57° C.) to reduce starchiness. At temperatures over about 135° F. (about 57° C.), the resultant dry parboiled rice product will, in addition to having an increased reduction of starchiness, tend to take longer to rehydrate. Tempering times as short as about 2 hours will provide some measurable reduction in starchiness; however, times of at least 3 hours are preferred, with times within the range of from about 6 hours to about 24 hours being most preferred to reduce starchiness in the rehydrated parboiled rice. The optimum set of conditions is presently believed to be at a temperature of about 130° F. (about 54° C.) for about 24 hours. Longer periods of time can also be employed, but are generally not considered economic.

During the tempering operation, the moisture content of the hydrated rice is preferably maintained at a level of from about 35 to about 45%. However, the moisture level may be slowly reduced during the tempering operation so long as it is not allowed to decrease below about 20%. Where the moisture content is reduced too rapidly to too great an extent, as in conventional drying procedures, the tempering will not proceed to the proper degree and the product will tend to be relatively more starchy.

Upon completion of the tempering step, the product can then be dried in a conventional manner. Beneficially, the rice can also be held between drying stages to allow the moisture to be removed without excessive stress on the rice structure. Typically, this might comprise forced convection drying at about 150° F. (about 66° C.) for about 2 hours, then letting the product stand for about 1 to 1¼ hours before resuming drying at about 100° F. (about 38° C.) for another ¾ of an hour, and again letting the product stand for ¾ of an hour before resuming drying for ¾ hour at 100° F. (about 38° C.), and recycling the rice at these last stated conditions one or more further times to achieve a preferred final moisture content of from about 8 to about 14%. After drying, the product is permitted to temper for from about 24 to about 48 hours to relieve any mechanical stresses within the rice kernels prior to milling under conventional conditions. Following drying the rice is milled.

According to an alternate embodiment, the milled rice can be washed of surface starch and then dried prior to packaging. The washing is typically performed by immersing the rice in water maintained at a temperature of about 200° to about 210° F. (about 93° to about 100° C.) and agitating for from about 0.5 to about 2 minutes. The rice can then be dried in a conventional belt dryer at 275° F. (135° C.) for 7 to 10 minutes to reduce the moisture content to about 8 to about 14%.

BEST MODE FOR CARRYING OUT THE INVENTION

The following examples are presented for the purpose of describing what is presently considered the best mode for carrying out the invention, and are not intended to be limiting in any regard. Unless otherwise indicated, all parts and percentages are by weight.

EXAMPLE I

Five pounds (2.3 Kg) of paddy rice is placed in a vacuum chamber which is evacuated to a pressure of 27 inches of mercury (0.93 Kg per cm$^2$) where it is maintained for about 30 minutes. While the partial vacuum is maintained, fifteen pounds (6.8 Kg) of water, acidified to a pH of about 7 with phosphoric acid and heated to a temperature of about 160° F. (71° C.), is introduced into the vacuum chamber. The vacuum is released and the rice is steeped in the water for about 2½ hours. At the end of this time period, the rice has a moisture content of about 38%. The hydrated rice is then drained and exposed to saturated steam in an atmospheric belt steamer to partially gelatinize the starch. The saturated steam subjects the rice to a temperature of about 195° F. (91° C.) for about fifteen minutes. The resulting, partially gelatinized rice is then removed from the steaming chamber and held in a sealed container at 45% moisture, for 6 hours at a temperature which is maintained at about 130° F. (54° C.) to temper the rice. The tempered rice is then forced convection dried at 150° F. (66° C.) for 2 hours, held at ambient temperature for 1¼ hours, dried at 100° F. (38° C.) for ¾ hour, held at ambient for ¾ hour, dried for ¾ hour at 100° F. (38° C.), held at ambient for ¾ hour, and finally dried for another ¾ hour at 100° F. (38° C.). The resulting quick cooking parboiled rice product has a moisture content of 12.5%. As measured by percent of alkali soluble starch the parboiled rice starch has been gelatinized to about 39%. This parboiled rice shows an amylograph breakdown value of 10 brabender units and can be rehydrated fully by cooking in boiling water at atmospheric pressure for 15 minutes. Upon rehydration the parboiled rice exhibits the desireable dense, rubbery, non-starchy texture characteristics of conventional parboiled rice.

EXAMPLE II

This example presents a comparison between a rice product prepared in accordance with the conditions of Example I (identified as the Experiment 1 sample) and two products prepared in essentially the same manner, except that in the Control 1 sample the steaming step is conducted for a period of time sufficient to completely gelatinize the starch therein (no tempering step needed), and in the Control 2 sample the tempering step after steaming but prior drying is eliminated. The results are shown in the following table:

| Sample | Gelatinization (%) | Amylograph Breakdown Value (Brabender Units) | Rehydration Time (Minutes) |
|---|---|---|---|
| Exp. 1 | 39% | 10 | 15 |
| Con. 1 | 100% | −50 | 25 |
| Con. 2 | 37% | 270 | 15 |

The samples of Experiment 1 and Control 1 upon rehydration exhibited a desireable dense, non-starchy texture. The sample of Control 2 upon rehydration was desireably dense, but had a starchy texture and taste. This direct comparison demonstrates the desireable effect which the tempering step has upon the quick-cooking parboiled rice.

The above description is for the purpose of teaching those skilled in the art how to practice the present invention and is not intended to recite all the possible modifications and variations thereof which will become apparent to the skilled worker upon reading. It is intended, however, that all such modifications and variations be included within the scope of invention which is defined by the following claims.

What is claimed:

1. A process for preparing a dry parboiled rice which requires a reduced rehydration time while producing a rehydrated rice with decreased starchiness, comprising: (a) soaking rough rice in water to increase the moisture content to 30 to 45% by weight thereby producing a hydrated rice but without effecting substantial gelatinization; (b) removing the rice from the steeping water and steaming the hydrated rice under conditions effective to partially gelatinize substantially all starch granules in the rice kernel but without fully gelatinizing said granules; (c) tempering the partially-gelatinized rice for a period of time, at a temperature below the gelatinization temperature of the starch while maintaining the level of moisture above 20%, said tempering being effective to reduce subsequent rupturing of the starch granules upon rehydration; (d) drying the rice to a moisture content of less than 15%; and (e) milling the rice.

2. A process according to claim 1 wherein the steaming is effective to gelatinize the rice starch, as measured indirectly through percent alkali soluble starch, to about 20 to about 75%.

3. A process according to claim 2 wherein the steaming is effective to gelatinize the rice starch, as measured indirectly through percent alkali soluble starch, to about 30 to about 55%.

4. A process according to claim 1 wherein the steaming is effective to partially gelatinize the starch to the extent that there are birefringent crosses remaining when observed under polarized light.

5. A process according claim 1 wherein the tempering is conducted for at least two hours at a temperature of from about 70° F. to about 150° F.

6. A process according to claim 5 wherein the tempering is conducted for a period of at least 6 hours at a temperature within the range of from about 125° F. to about 135° F. and a moisture content within the range of from about 35 to about 45%.

7. A process according to claim 1 which further comprises washing the milled rice to remove surface starch, and then drying the washed, milled rice.

8. A process according to claim 1 wherein the rough rice is soaked at a temperature of from about 140° to about 170° F.

9. A process according to claim 8 wherein the soaking is done under conditions effective to raise the moisture content to within the range of from about 35 to about 40%.

10. A process according to claim 9 wherein the soaking step is conducted under atmospheric pressure for a period of time within the range of from about 1 to about 4 hours.

11. A process according to claim 1 wherein the rough rice is subjected to a partial vacuum to remove air trapped under the rice hulls prior to soaking.

12. A process according to claim 1 wherein the soaking is conducted at a pressure of from about 50 to about 150 psig.

13. A process according to claim 1 which produces a rice having a rehydration time of less than 20 minutes.

14. A process according to claim 1 wherein the amylograph breakdown of the starch is within the range of from about 0 to about 100 brabender units.

15. A process according to claim 14 wherein the amylograph breakdown of the starch is within the range of from about 0 to about 50 brabender units.

16. A process according to claim 1 wherein the soaking water is acidified to a pH between 3 and 7.

17. The dry parboiled rice prepared by the process of claim 1.

* * * * *